(12) United States Patent
Takahashi et al.

(10) Patent No.: US 7,738,992 B2
(45) Date of Patent: Jun. 15, 2010

(54) NUMERICAL CONTROL SYSTEM INCLUDING MACHINE CONTROL SYSTEM AND COLLISION DETECTION SYSTEM

(75) Inventors: Nobuyuki Takahashi, Tokyo (JP); Hiromichi Nigazawa, Tokyo (JP); Takashi Kamiya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 345 days.

(21) Appl. No.: 11/936,369

(22) Filed: Nov. 7, 2007

(65) Prior Publication Data

US 2008/0125874 A1 May 29, 2008

(30) Foreign Application Priority Data

Nov. 24, 2006 (JP) ............................. 2006-316863

(51) Int. Cl.
  *G06F 19/00* (2006.01)
(52) U.S. Cl. ...................................... 700/178; 700/177
(58) Field of Classification Search ................ 700/177, 700/178
  See application file for complete search history.

(56) References Cited

U.S. PATENT DOCUMENTS

2005/0283270 A1* 12/2005 Nakamura ................. 700/178

FOREIGN PATENT DOCUMENTS

| JP | 2004-227047 | 8/2004 |
|---|---|---|
| JP | 2005-128686 | 5/2005 |
| JP | 2006-195862 | 7/2006 |
| JP | 2007-172068 | 7/2007 |

* cited by examiner

*Primary Examiner*—Ryan A Jarrett
(74) *Attorney, Agent, or Firm*—Oblon, Spivak, McClelland, Maier & Neustadt, L.L.P.

(57) ABSTRACT

A numerical control system improves safety when asynchronously operating systems are operated as a single control unit. A machine control system outputs a command generated by interpreting a program with a command number assigned thereto, sends it to a collision detection system, and receives check result data therefrom, whereby when the number of commands for which check result data are obtained is more than or equal to a preset second threshold, a command number assigned to the check result data is output when it is determined that there is no probability of collision. When the result of a check on the probability of collision for a command received from a linkage data sending and receiving section is returned, the collision detection system returns check result data to the linkage data sending and receiving section by assigning a command number given to the checked command to the check result data.

7 Claims, 11 Drawing Sheets

NUMERICAL CONTROL SYSTEM INCLUDING MACHINE CONTROL SYSTEM AND COLLISION DETECTION SYSTEM

BACKGROUND OF THE INVENTION

1. Field of the Invention

The present invention relates to a numerical control system comprising a plurality of systems having their control periods different from one another.

2. Description of the Related Art

As a numerical control apparatus in recent years, there is one which includes a control system for controlling a machine as a main function of the numerical control apparatus, and an operating system for providing an input/output function to produce programs, to set parameters, and to set tool data for operation of a machine tool, wherein these systems function in association with each other as a numerical control system (see, for example, a first patent document: Japanese patent application laid-open No. 2002-108423).

In such a numerical control system, data transfer (sending and receiving) is carried out between the two systems. In the above-mentioned first patent document, a control unit for controlling the machine and a operation panel arranged outside of the control unit are electrically connected to each other, and if a processing request issued from the control unit is not received by the operation panel, it is assumed that abnormality occurs.

However, conventionally, a numerical control apparatus is provided with a collision prevention function to prevent collisions between parts of a machine, tools, jigs and materials by checking shape data thereof by means of a computer (see, for example, a second patent document: Japanese patent application laid-open No. H5-8,152).

Collision checks have been performed in the past by using the shapes in the two-dimensional plane of the machine parts, tools, jigs and materials, but in recent years, such checks are being made by using three-dimensional shape data (see, for example, a third patent document: Japanese patent application laid-open No. H9-230,918).

However, in the numerical control apparatus as described in the above-mentioned first patent document, whether the operation panel receives a signal is only used as a criterion for determination, so there is a problem that only a system malfunction can be determined.

In addition, in the above-mentioned numerical control system as described in the second patent document, the more precisely a real machine is tried to be expressed so as to perform collision detection with high accuracy by using three-dimensional shapes, the more processing time is required, and in that case, there will be a problem of inducing a system malfunction.

Further, if the system falls into a state in which a lot of processing time for collision detection is required in case where a tool and a material are in contact with each other, there is a problem that a work to be processed might be damaged or the tool might be broken.

SUMMARY OF THE INVENTION

In view of the above, the object of the present invention is to provide a numerical control system that is capable of improving safety when a plurality of systems individually operating in asynchronization with one another are operated as a single control unit.

Bearing the above object in mind, according to the present invention, there is provided a numerical control system in which a machine control system for controlling a machine at a prescribed period and a collision detection system, which operates in a period different from that of the machine control system or in a constantly changing period to check a probability of collision for a command that operates the machine, are operated in association with each other. The machine control system includes: a command generation section that interprets a program for operating the machine, generates a command to the machine in the unit of control, and outputs the command by assigning to the command a command number for uniquely specifying an execution place of the program in the unit of control; a command buffer section that stores a predetermined number of commands output from the command generation section; a linkage data sending and receiving section that copies one of the commands stored in the command buffer section, sends it to the collision detection system, and transfers check result data when the check result data related to the probability of collision for the command is returned from the collision detection system; a check result data buffer section that stores the check result data transferred from the linkage data sending and receiving section; a command output determination section that analyzes the earliest stored one of the check result data stored in the check result data buffer section when the number of commands for which check result data are obtained among the commands stored in the command buffer section is more than or equal to a preset second threshold, and outputs a command number assigned to the earliest stored check result data when it is determined from the analysis of the earliest stored check result data that there is no probability of collision; and a machine drive section that takes out, when a command number is output from the command output determination section, a command of the command number from the command buffer section, and applies the command thus taken out to the machine, the machine drive section being operable to temporarily stop the machine thereby to decelerate or stop it when there is no command number output from the command output determination section. When the probability of collision for a command received from the linkage data sending and receiving section is checked, the collision detection system returns check result data to the linkage data sending and receiving section by assigning a command number given to the checked command to the check result data.

The numerical control system according to the present invention achieves the following advantageous effect. That is, in the numerical control system using a collision detection system in which a processing time tends to become large as compared with a control period, the machine can be safely stopped even if there is a response delay from the collision detection system, or if there occurs a communication failure.

The above and other objects, features and advantages of the present invention will become more readily apparent to those skilled in the art from the following detailed description of preferred embodiments of the present invention taken in conjunction with the accompanying drawings.

FIG. is such as it is. 4 is a view showing how contour data of a machine is moved according to commands.

Figure 5:
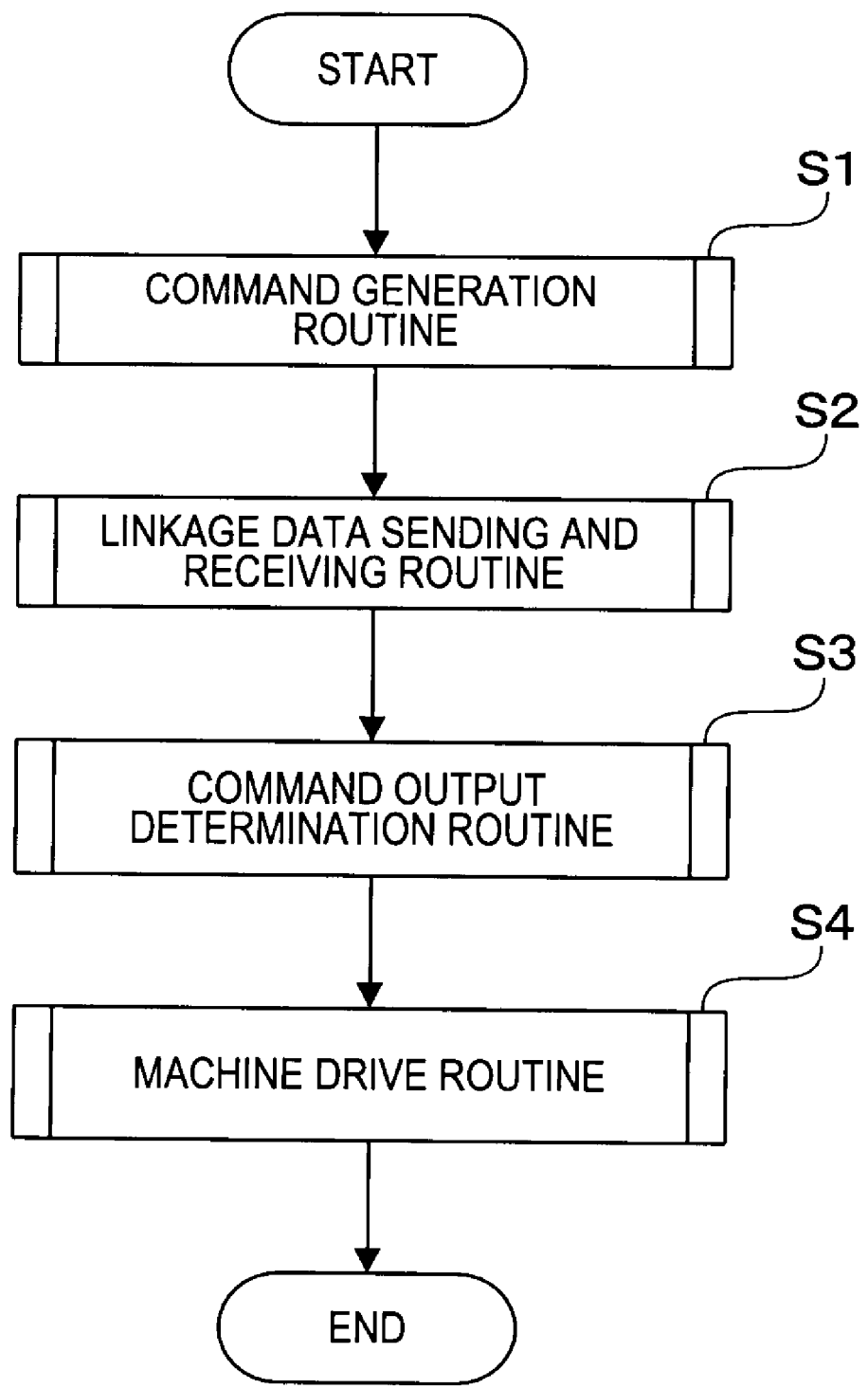

FIG. 5 is a flow chart illustrating the flow of processing of a machine control system according to the first embodiment of the present invention.

Figure 6:
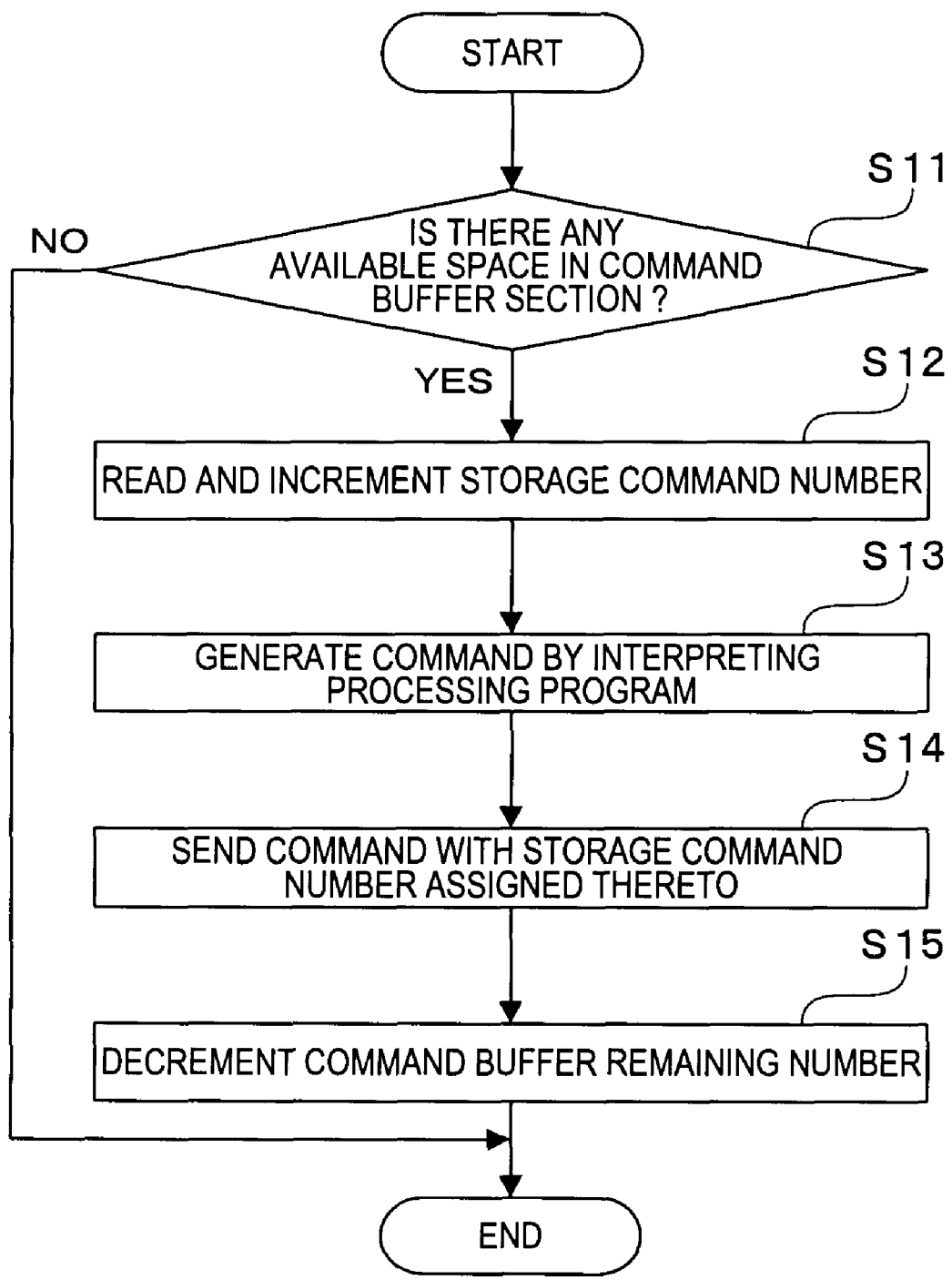

FIG. 6 is a flow chart illustrating the procedure of a command generation routine according to the first embodiment of the present invention.

Figure 7:
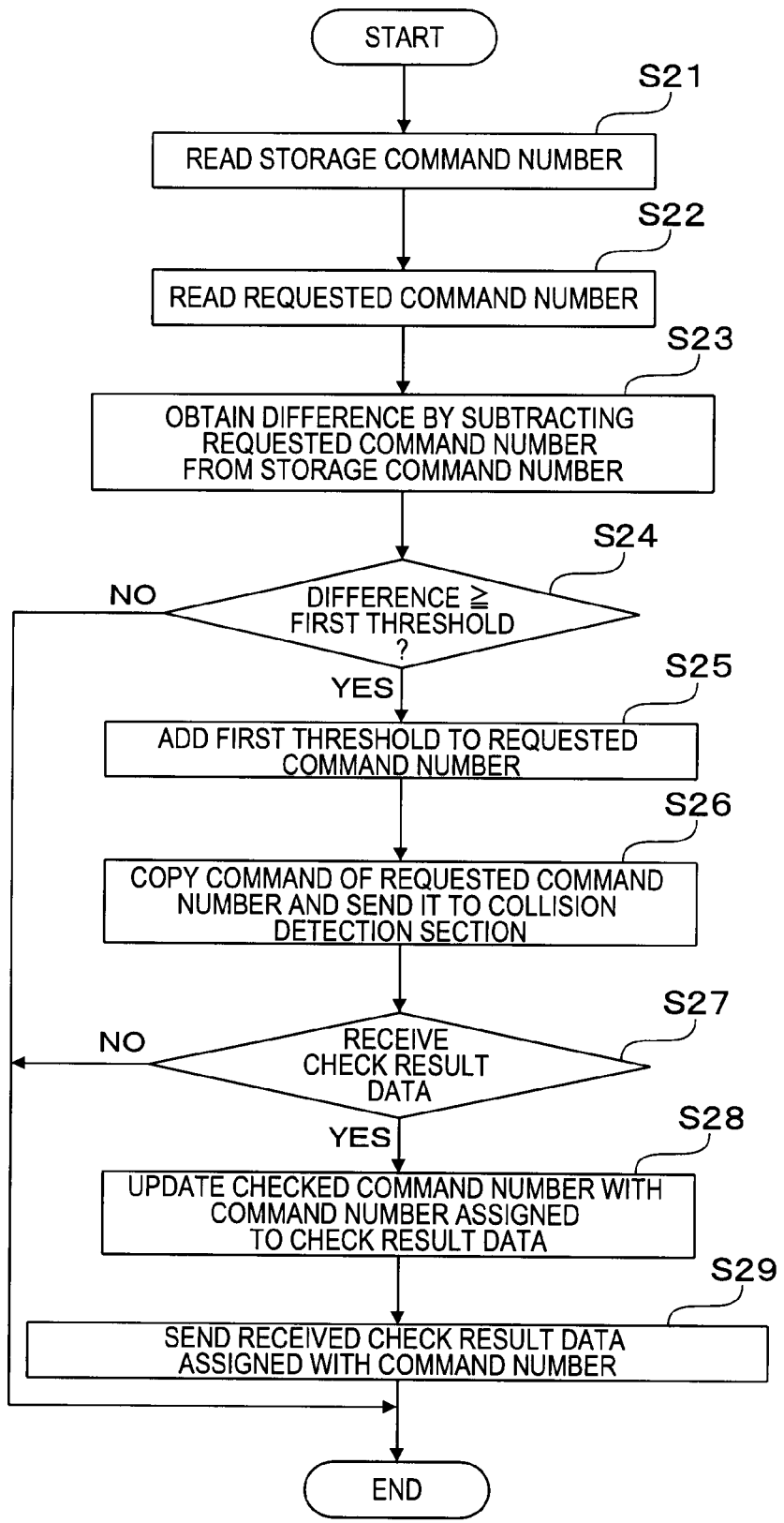

FIG. 7 is a flow chart illustrating the procedure of a linkage data sending and receiving routine according to the first embodiment of the present invention.

Figure 8:
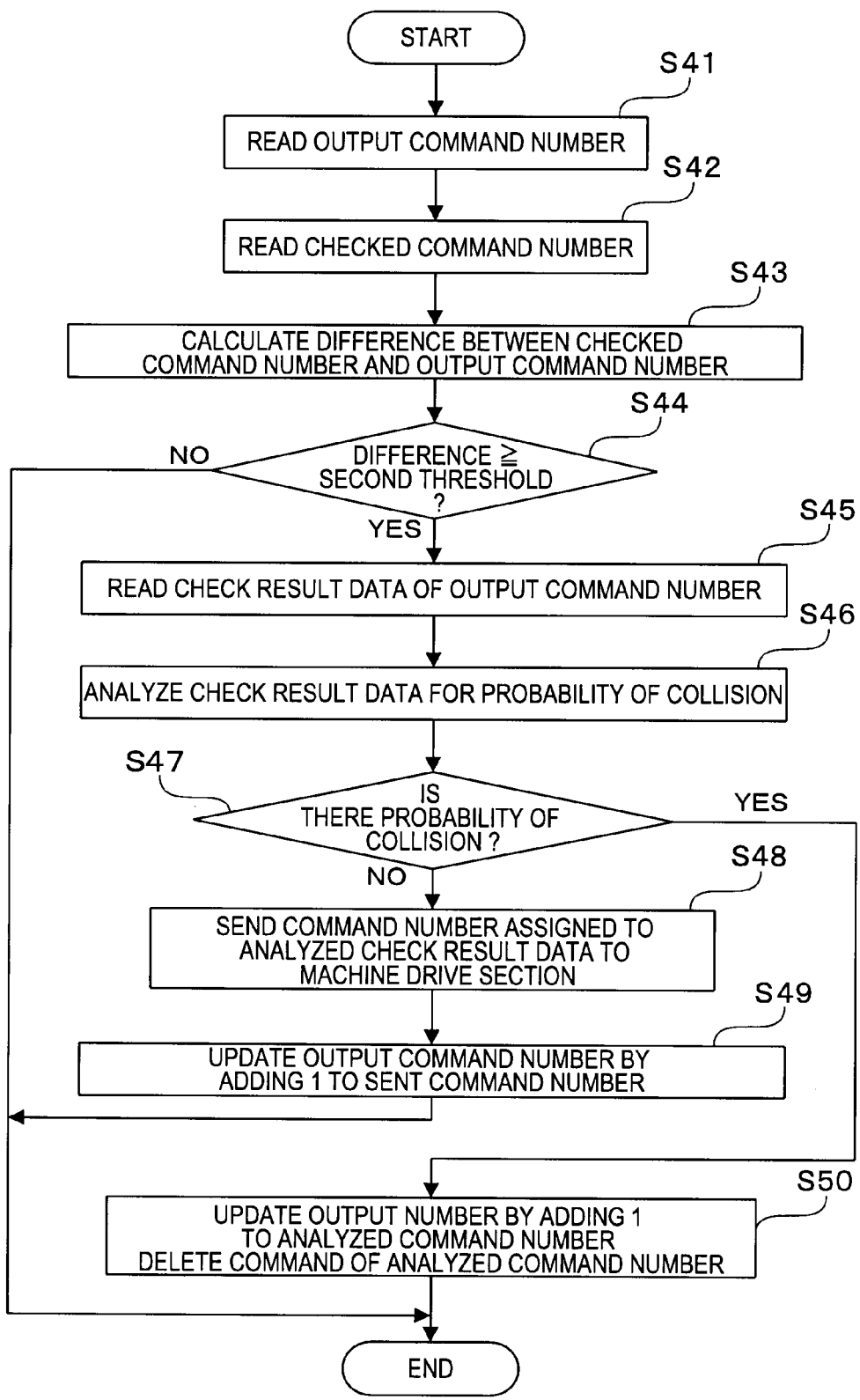

FIG. 8 is a flow chart illustrating the procedure of a command output determination routine according to the first embodiment of the present invention.

Figure 9:
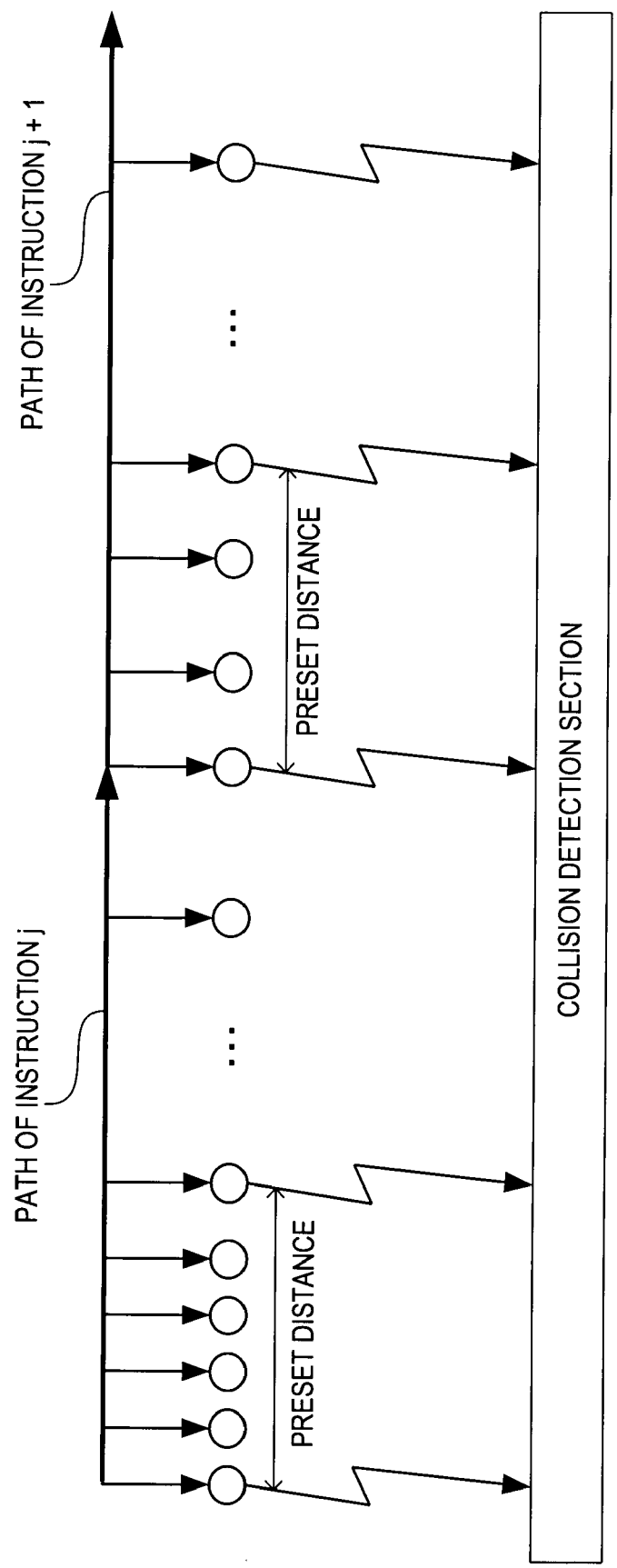

FIG. 9 is a view showing how to send the latest data to a collision detection section when a distance between a command of a requested command number and the latest command last stored in a command buffer section becomes equal to or more than a preset distance.

Figure 10:
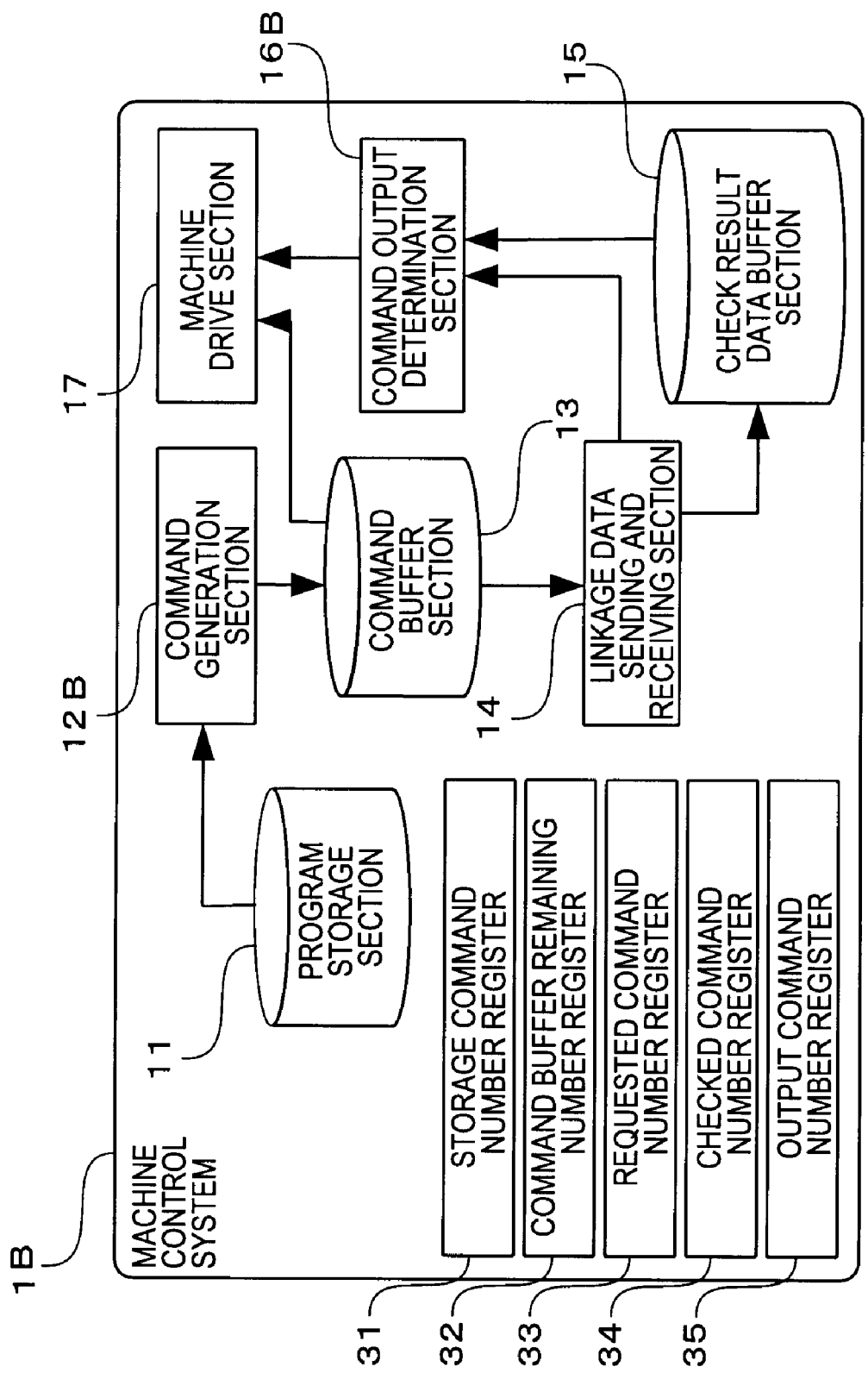

FIG. 10 is a block diagram of a machine control system according to a second embodiment of the present invention.

Figure 11:
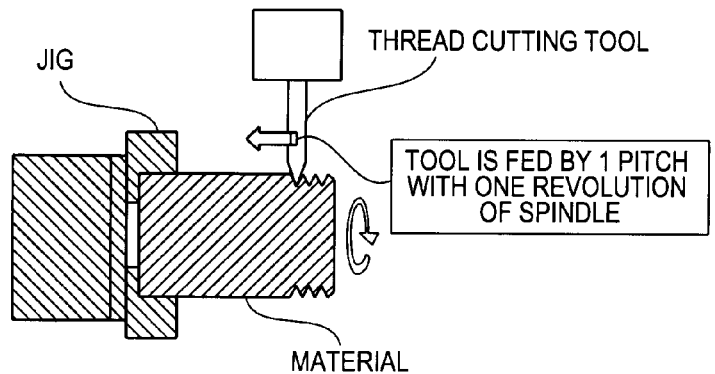

FIG. 11 is a view showing how a tool is moved when a movement instruction is a thread cutting instruction.

Figure 12A:
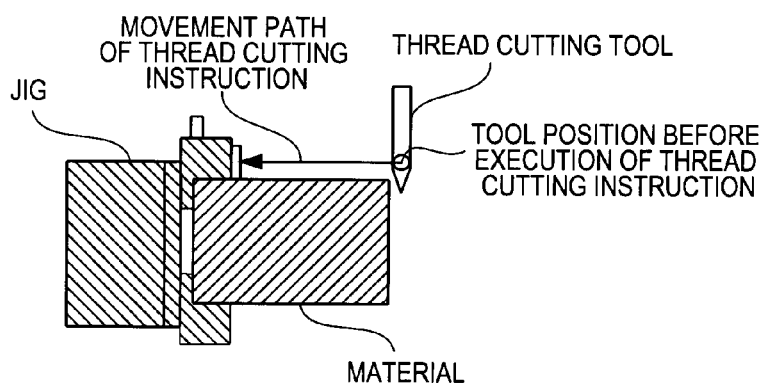
Figure 12B:
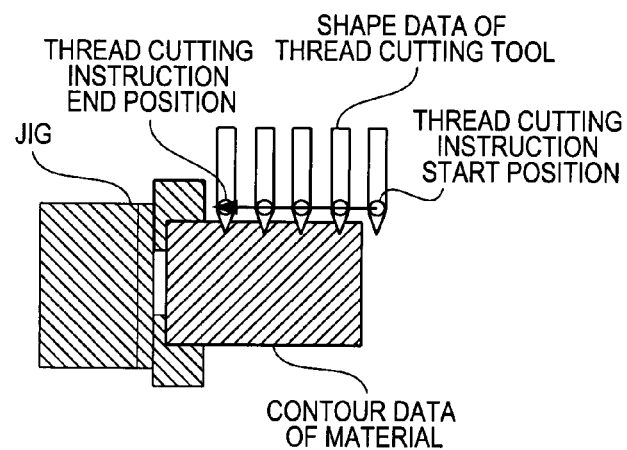

FIGS. 12A and 12B are views showing how the movement of the tool is stopped until a series of commands have been checked in case where a movement instruction is a thread cutting instruction.

DESCRIPTION OF THE PREFERRED EMBODIMENTS

Hereinafter, preferred embodiments of the present invention will be described in detail while referring to the accompanying drawings.

Embodiment 1

Figure 1:
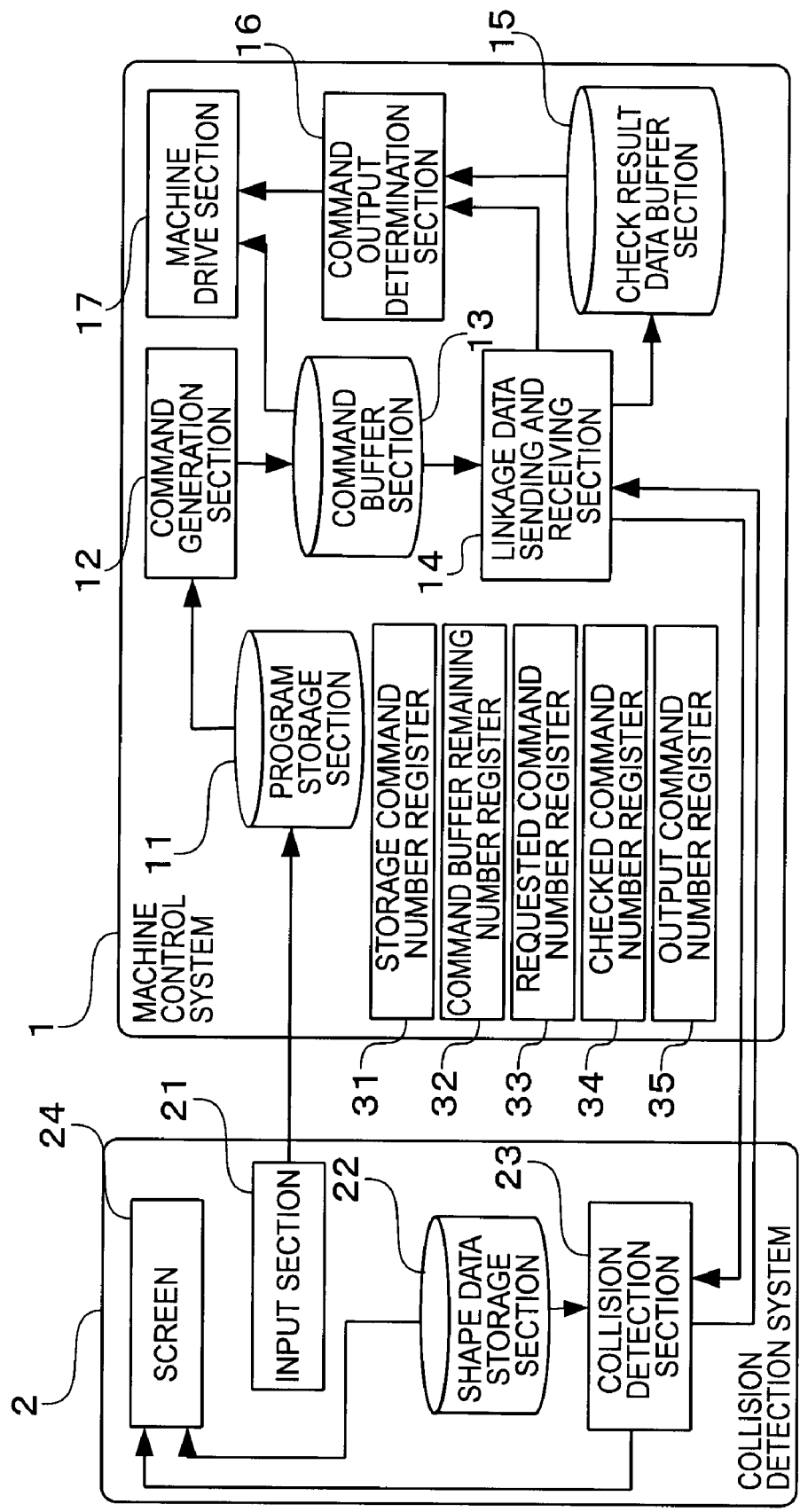
FIG. 1 is a block diagram showing the configuration of a numerical control system according to a first embodiment of the present invention.

Referring to the drawings and first to FIG. 1, there is shown, in a block diagram, the configuration of a numerical control system according to a first embodiment of the present invention.

The numerical control system according to the first embodiment of the present invention is provided with a machine control system 1 that controls a machine at a prescribed period or cycle and a collision detection system 2 that operates in a period different from that of the machine control system 1 or in a constantly changing period, wherein the machine control system 1 and the collision detection system 2 operate in association with each other.

The machine control system 1 has a program storage section 11, a command generation section 12, a command buffer section 13, a linkage data sending and receiving section 14, a check result data buffer section 15, a command output determination section 16, and a machine drive section 17.

In addition, the machine control system 1 further has a storage command number register 31 that holds a command number (hereinafter referred to as a storage command number) assigned to a command generated in a most recent control period of the machine control system 1 (hereinafter referred to as a control period), a command buffer remaining number register 32 that holds the number of remaining data in the command buffer section 13 (hereinafter referred to as a command buffer remaining number), a requested command register 33 that holds a command number of a most recently requested command (hereinafter referred to as a requested command number) for which a check on the probability of collision was most recently requested to the collision detection system 2, a checked command number register 34 which holds a command number of a most recently checked command (hereinafter referred to as a checked command number) for which a check on the probability of collision was most recently completed in the collision detection system 2, and an output command number register 35 that holds a command number (hereinafter referred to as an output command number) given to a command that is output to the machine drive section 17 in the following control period stored in the command buffer section 13.

The program storage section 11 is a storage medium that stores a processing program input from an input section 21.

Figure 2:
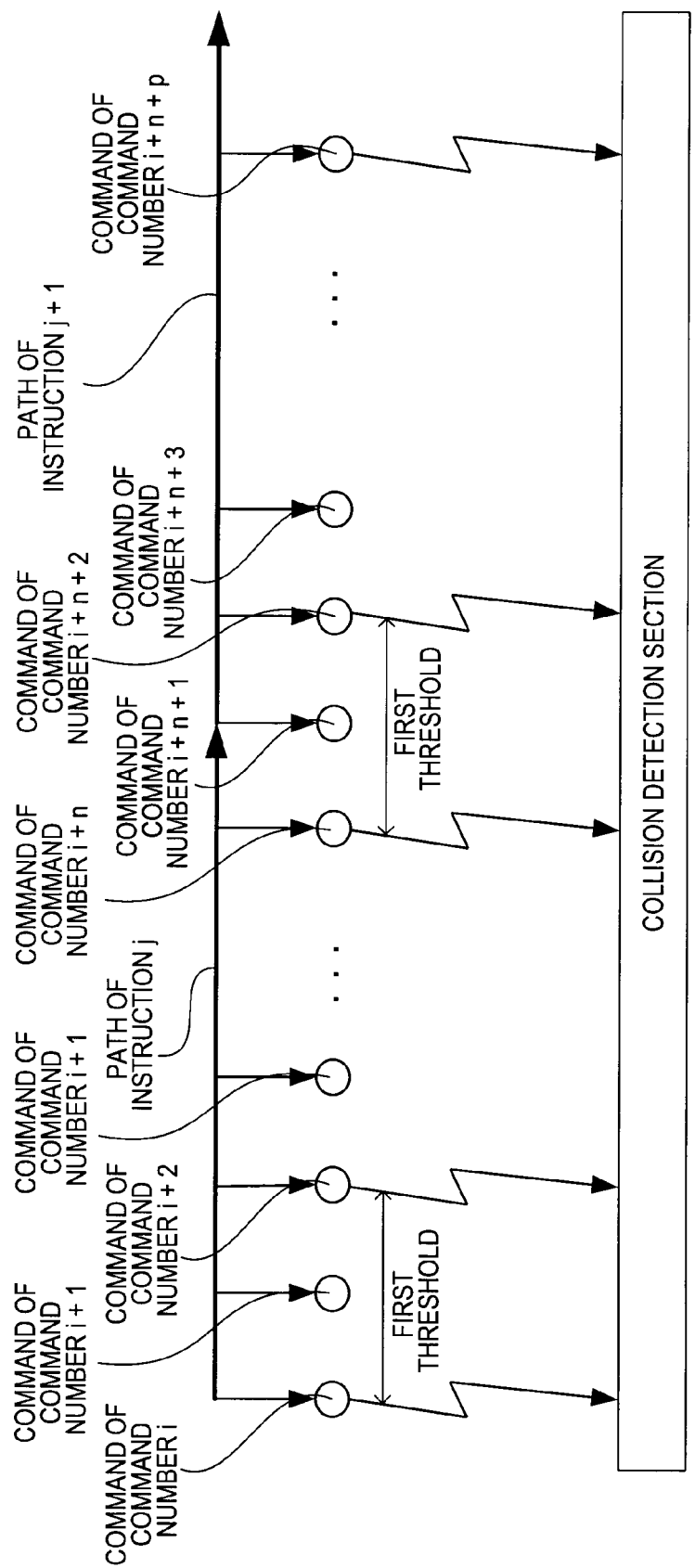
FIG. 2 is a view showing how to generate command numbers in the order of interpretations of instructions consistently from the first to last of a program in the present invention.

The command generation section 12 generates commands in units of control by interpreting the processing program stored in the program storage section 11. Here, note that the commands in units of control includes individual machine axis movement commands comprising positions in a route in each preset control period, as shown in FIG. 2, so as to make a tool move on the route indicated by a movement instruction described in the processing program, and non-movement commands such as a tool exchange command, a turning spindle rotation command, etc., that do not accompany any machine axis movement.

In the explanation of the present invention, a unit instruction described in the processing program is simply called an "instruction" or a "program instruction". Also, the commands in units of control are called "commands", and a movement command for each machine axis, which comprises a position obtained by dividing (interpolating) a segment formed of a movement instruction by a length by which the machine axis can advance or move in the control period, is called a "movement command".

In addition, when outputting a command in each unit of control to the command buffer 13, the command generation section 12 assigns a number consecutively counting commands generated from the start of the program until now to the command to be currently output as data for uniquely specifying an execution location of the program in units of control. The number thus assigned is simply called hereinafter a "command number", and each time a command is output to the command buffer section 13, the storage command number register 31 is incremented, and the command buffer remaining number register 32 is decremented.

Thus, a serial or sequential number is generated and assigned as a command number each time an instruction is interpreted to generate a command, so a unique number can be assigned to the command thus generated in ascending order in a simple manner.

Figure 3:
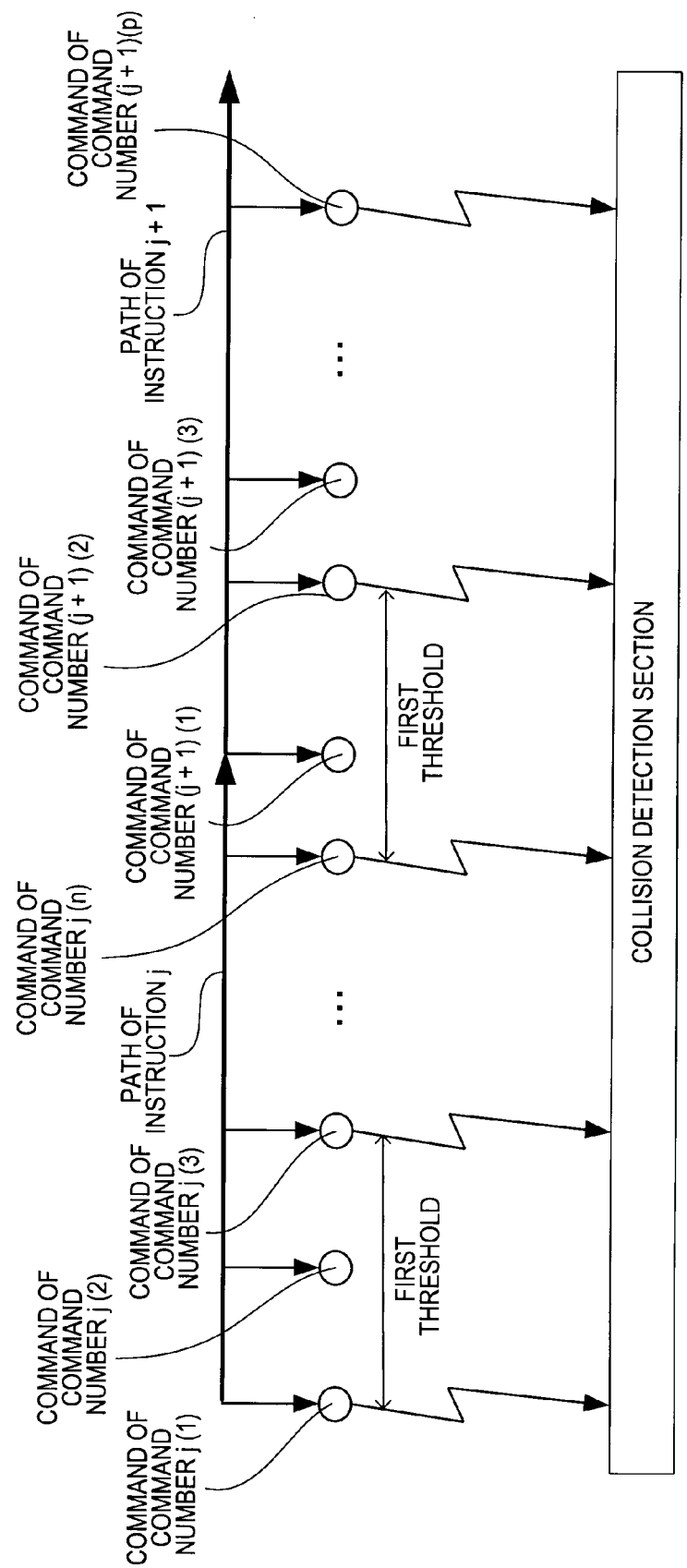
FIG. 3 is a view showing how to generate command numbers by combining numbers representing the order of instructions and numbers representing the order of interpretations in each instruction according to the present invention.

Here, note that as another form of data for uniquely specifying a portion or place of a program being executed in units of control, there may be used data comprising two pieces of data, i.e., a number which sequentially counts the number of instructions from the first instruction of the program, and a number which sequentially counts, upon each generation of one program instruction, the number of commands from a movement command first generated with respect to the one program instruction, as shown in FIG. 3.

Also, as a still another form of data for uniquely specifying a portion or place of a program being executed in units of control, there may be used data comprising two pieces of data, i.e., a number which sequentially counts the number of instructions from the first instruction of the program, and a distance from an end point indicated by one program instruction to a command, which is sequentially calculated, upon each generation of the one program instruction, from a movement command first generated for the program instruction.

Thus, it is possible to specify a portion or place of a program being executed in units of control by the order of instructions in the program and the distance or order closed in each instruction. As a result, there is no fear of overflowing.

The command buffer section 13 comprises M pieces of data, hereinafter called a datum, where a command assigned with a command number is temporarily stored for collision check of the command by the collision detection system 2 before the machine drive section 17 takes out the command. When the machine drive section 17 takes out the command from the command buffer section 13, the datum therein where the command is stored becomes empty, and the command buffer remaining number register 32 is incremented each time a datum becomes empty.

When a difference obtained by subtracting the requested command number from the storage command number is larger than a first preset threshold, the linkage data sending and receiving section 14 sends a command of a command number obtained by adding the first threshold to the requested command number amongst the commands stored in the command buffer section 13 to a collision detection section 23, and holds the command number assigned to the sent command in the requested command register 33.

In addition, the linkage data sending and receiving section 14 receives check result data assigned with a command number, which is sent back from the collision detection section 23, and adds the check result data thus received to the last datum in the check result data buffer section 15. At this time, the command number assigned to the check result data and added to the checked command number register 34 is held.

When the difference obtained by subtracting the output command number from the checked command number is larger than or equal to a second threshold, the command output determination section 16 takes out check result data of the smallest command number from the check result data buffer section 15, analyzes it and determines the probability of collision. In case where there is no probability of collision, the command output determination section 16 outputs the command number assigned to the analyzed check result data to the machine drive section 17. At this time, the command number, which is output to the output command number register 35, is incremented and updated.

On the other hand, when it is determined on the contrary that there is a probability of collision, the command output determination section 16 does not output the command number assigned to the check result data to the machine drive section 17, and at this time updates the output command number register 35 by incrementing it.

The machine drive section 17 takes out a command of the command number output from the command output determination section 16 from the command buffer section 13, and applies it to the movement of each axis of a machine to be controlled.

In addition, when no command number is sent from the command output determination section 16, the machine drive section 17 accelerates or decelerates the machine to finally stop it completely by applying acceleration and deceleration filter processing thereto.

Here, note that the machine drive section 17 may perform acceleration and deceleration processing, for instance, by applying a moving average filter to the command taken out from the command buffer section 13, as in the case of well-known numerical control apparatuses, whereby each axis of the machine is caused to operate in a smooth manner so as not to be operated with stepwise speed changes.

Figure 4:
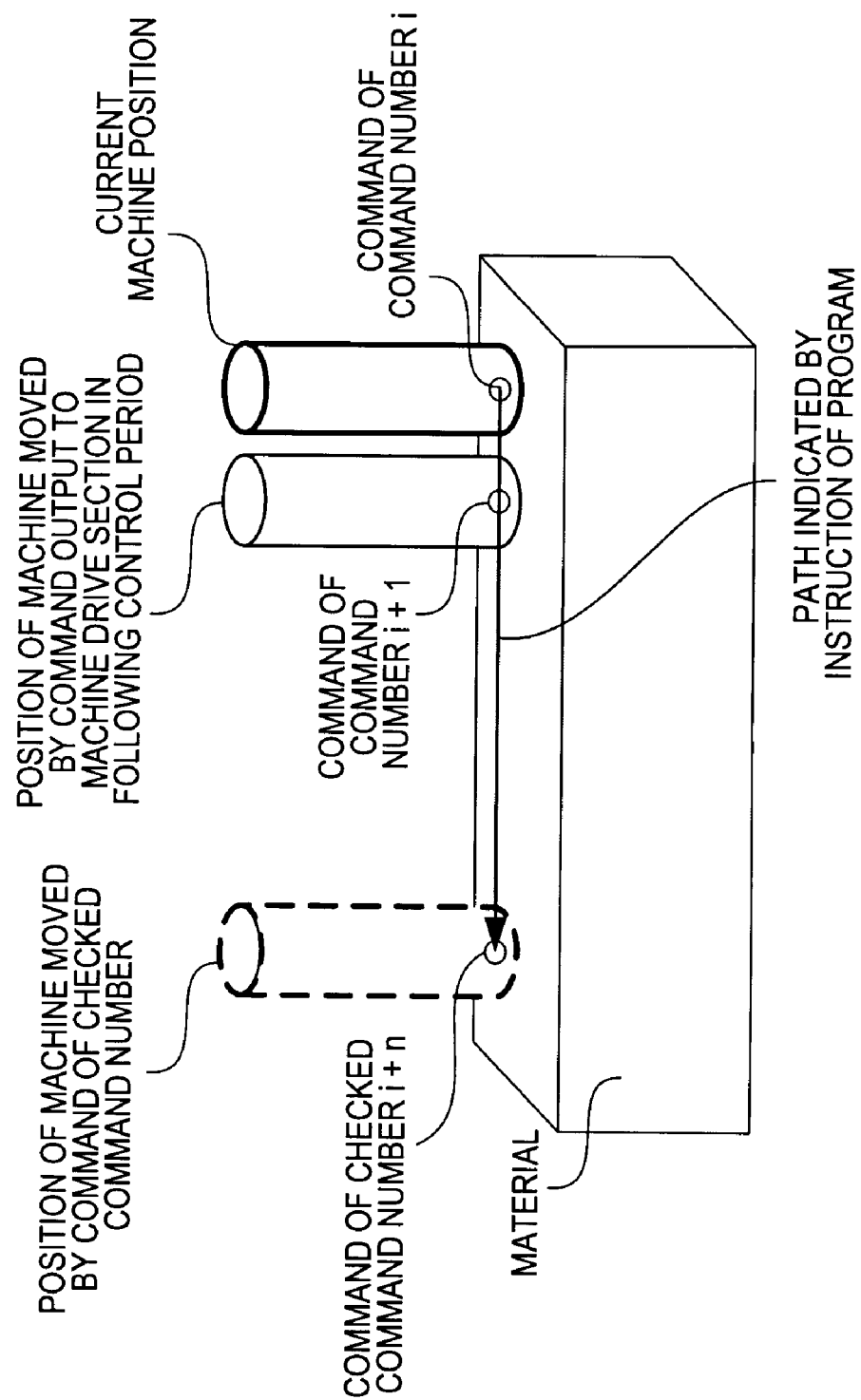

The relation among the position of the machine that is caused to move by a movement command stored in the last datum of the check result data buffer section 15, the current position of the machine, and the position of the machine that is caused to move by a movement command stored in the first datum of the command buffer section 13 becomes as shown in FIG. 4.

The collision detection system 2 has the input section 21, a shape data storage section 22, a collision detection section 23, and a screen 24.

The input section 21 includes man-machine interface devices such as a keyboard, a mouse, etc., and storage mediums such as a flash memory, a hard disk, etc., and serves to input the processing program to the collision detection system 2.

The shape data storage section 22 is in the form of a storage medium that stores the shape data of objects existing in the machine, such as individual portions of the machine to be controlled, tools attached to the machine, jigs for mounting materials to the machine, the materials, etc. Note that in the following explanation, the shape data of the objects existing in the machine to be controlled is simply called "shape data".

In case where the command received from the linkage data sending and receiving section 14 is a movement command, the collision detection section 23 checks, by moving the shape data according to the movement command, whether individual pieces of shape data are in a non-collision state in which a distance between adjacent pieces of shape date is larger than a preset distance, or in a close state in which the distance between adjacent pieces of shape date is less than or equal to the preset distance, or in a collision state in which adjacent pieces of shape date are partially overlapped with each other.

In addition, the collision detection section 23 assigns the command number, which has been assigned to the checked command, to the check result data that indicates a close state, a collision state or a non-collision state, and returns it to the linkage data sending and receiving section 14.

In this regard, note that the collision detection section 23 detects the non-collision state, the close state or the collision state, and specifies shape data that are under such a state, wherein the check result data may include, for example, the data of a portion or place name, or a portion or place number, etc., and the closest distance between adjacent pieces of shape data.

Now, reference will be made to the flow of processing of the machine control system 1 according to the first embodiment of the present invention while referring to FIG. 5. FIG. 5 is a flow chart that illustrates the flow of processing of the machine control system 1 according to the first embodiment of the present invention. The flow of processing of the machine control system according to the first embodiment includes, in each control period, a command generation routine (step S1), a linkage data sending and receiving routine (ste S2), a command output determination routine (step S3), and a machine drive routine (step S4).

The command generation routine executed in the command generation section 12 will be described while referring to FIG. 6. FIG. 6 is a flow chart that illustrates the procedure of the command generation routine according to the first embodiment of the present invention.

In step S11, the command buffer remaining number is read out from the command buffer remaining number register 32, and it is determined whether there is an available space in the command buffer section 13. When there is a available space in the command buffer section 13, the control flow proceeds to step S12, whereas when there is no available space in the command buffer section 13, the command generation routine is terminated.

In step S12, a storage command number is read out from the storage command number register 31, and a command number is generated by incrementing the storage command number thus read out.

In step S13, a command is generated by interpreting the processing program.

In step S14, the command number thus generated is assigned to the command thus generated, which is then sent to the command buffer section 13.

In step S15, the command buffer remaining number is decremented and the command generation routine is terminated.

Next, the linkage data sending and receiving routine executed in the linkage data sending and receiving section 14 will be described while referring to FIG. 7. FIG. 7 is a flow chart that illustrates the procedure of the linkage data sending and receiving routine according to the first embodiment of the present invention.

In step S21, the storage command number is read out from the storage command number register 31.

In step S22, the requested command number is read out from the requested command register 33.

In step S23, the requested command number is subtracted from the storage command number to calculate a difference therebetween.

In step S24, it is determined whether the difference between the requested command number and the storage command number is larger than or equal to the first threshold, and when the difference is larger than or equal to the first threshold, the control flow proceeds to step S25, whereas when the difference is less than the first threshold, the control flow proceeds to step S27.

In step S25, the first threshold is added to the requested command number thereby to update the requested command register 33.

In step S26, a command for the requested command number is copied from the command buffer section 13, and the requested command number is assigning to the command thus copied, which is then sent to the collision detection section 23.

In step S27, it is determined whether the check result data has been received from the collision detection section 23. When the check result data has been received, the control flow proceeds to step S28, whereas when the check result data has not been received, the linkage data sending and receiving routine is terminated.

In step S28, the checked command number is updated with the command number assigned to the check result data thus received.

In step S29, the received check result data thus assigned with the command number is sent to the check result data buffer section 15, and the linkage data sending and receiving routine is terminated.

Next, the command an output determination routine executed in the command output determination section 16 will be described while referring to FIG. 6. FIG. 8 is a flow chart that illustrates the procedure of the command output determination routine according to the first embodiment of the present invention.

In step S41, the output command number is read out from the output command number register 35.

In step S42, the checked command number is read out from the checked command number register 34.

In step S43, the output command number is subtracted from the checked command number to calculate a difference therebetween.

In step S44, it is determined whether the difference between the output command number and the checked command number is larger than or equal to the second threshold, and when the difference is larger than or equal to the second threshold, the control flow proceeds to step S45, where when the difference is less than the second threshold, the control flow proceeds to S50.

In step S45, the check result data of the output command number is read out.

In step S46, the check result data thus read out is analyzed for the probability of collision.

In step S47, as a result of the analysis, it is determined whether there is a probability of collision, and when there is no probability of collision, the control flow proceeds to step S48, whereas when there is a probability of collision, the control flow proceeds to step S50.

In step S48, the command number assigned to the check result data thus analyzed is sent to the machine drive section 17.

In step S49, the output command number register 35 is updated by adding 1 to the command number thus sent, and the command output determination routine is terminated.

In step S50, the output command number register 35 is updated by adding 1 to the command number assigned to the check result data thus received, and the command of the command number assigned to the analyzed check result data is deleted from the command buffer section 13, and the command buffer remaining number register 32 is incremented, after which the command output determination routine is terminated.

Next, the operation of the machine control system 1 will be exemplified by using a specific example.

Before a command is generated from the first instruction of the processing program, the storage command number, the requested command number, the checked command number, and the output command number are respectively set to 0, and the command buffer remaining number is set to 100. Also, the first threshold and the second threshold are respectively set to two. These values are examples, and the present invention is not limited to these.

In a first control period, the command buffer remaining number is 100 but not zero, so the storage command number is incremented by 1 to 1, and a command of command number 1 is stored in the command buffer section 13. Since the storage command number is 1 and the requested command number is 0, a difference between the storage command number and the requested command number becomes 1 and hence is less than the first threshold, so the operation of the machine control system 1 in the first control period is terminated.

In a second control period, the command buffer remaining number is 99 but not zero, so the storage command number is incremented by 1 to 2, and a command of command number 2 is stored in the command buffer section 13. Since the storage command number is 2 and the requested command number is 0, a difference between the storage command number and the requested command number becomes 2 and hence is larger than or equal to the first threshold, so the command of command number 2 is sent to the collision detection section 23. In the collision detection section 23, no response is made within one control period of the machine control system, so the operation of the machine control system 1 in the second control period is terminated.

In a third control period, the command buffer remaining number is 98 and not zero, so the storage command number is incremented by 1 to 3, and a command of command number 3 is stored in the command buffer section 13. Since the storage command number is 3 and the requested command number is 2, a difference between the storage command number and the requested command number becomes 1 and hence is less than the first threshold, so the command of command number 3 is not sent to the collision detection section 23. The check result data of command number 2, being returned by the collision detection section 23, is stored in the check result data buffer section 15, and the checked command number is adjusted to 2. Since the checked command number is 2 and the output command number is 0, a difference between the checked command number and the output command number becomes 2 and hence is larger than or equal to the second threshold, so the command of command number 1 is output to the machine drive section 17, and the operation of the machine control system 1 in the third control period is terminated.

In a fourth control period, the command buffer remaining number is 97 and not zero, so the storage command number is incremented by 1 to 4, and a command of command number 4 is stored in the command buffer section 13. Since the storage command number is 4 and the requested command number is 2, a difference between the storage command number and the requested command number becomes 2 and hence is larger than or equal to the first threshold, so the command of command number 4 is sent to the collision detection section 23. No response from the collision detection section 23, is made within this fourth control period of the machine control system, so the operation of the machine control system 1 in the fourth control period is terminated.

In a fifth control period, the command buffer remaining number is 96 and not zero, so the storage command number is incremented by 1 to 5, and a command of command number 5 is stored in the command buffer section 13. Since the storage command number is 5 and the requested command number is 4, a difference between the storage command number and the requested command number becomes 1 and hence is less than the first threshold, so the command of command number 5 is not sent to the collision detection section 23. The check result data of command number 4, being returned by the collision detection section 23, is stored in the check result data buffer section 15, and the checked command number is adjusted to 5. Since the checked command number is 5 and the output command number is 1, a difference between the checked command number and the output command number is 4 and hence is larger than or equal to the second threshold, so the probability of collision is determined, and the command number 2 is output to the machine drive section 17, after which the operation of the machine control system 1 in the fifth control period is terminated.

The numerical control system according to this first embodiment sends out from the machine control system a command that is assigned with a command number in the form of data for uniquely specifying a portion or place of a program being executed in the unit of control, whereas the collision detection system sends back check result data assigned with the command number that has been assigned to the checked command. As a result, even in a combined or complex numerical control system having asynchronous processing periods, it is possible to avoid the occurrence of collision therein even if the processing time of the collision detection system is extended or if the system fails.

In the first embodiment, when a difference between command numbers reaches the first preset threshold, the linkage data sending and receiving section 14 sends a command for check to the collision detection section 23, but when a distance between commands corresponding to held command numbers reaches a preset distance, a command for check may be sent to the collision detection section 23, as shown in FIG. 9.

Embodiment 2

FIG. 10 is a block diagram of a machine control system according to a second embodiment of the present invention.

A numerical control system according to the second embodiment of the present invention is different from the numerical control system according to the first embodiment in a machine control system 1B, but is the same in other respects as that of the first embodiment with the like parts or elements being identified by the same reference numerals and characters while omitting an explanation thereof, as shown in FIG. 10.

The machine control system 1B according to this second embodiment is different from the machine control system 1 of the first embodiment in a command generation section 12B and a command output determination section 16B, but is the same in other respects as that of the machine control system 1, and hence like components or parts are identified by like reference numerals and characters while omitting a detailed explanation thereof. The command generation section 12B according to the second embodiment interprets a processing program stored in the program storage section 11, obtains positions on a path in each preset control period so as to make a tool move on the path indicated by a movement instruction described in the processing program, and generates a movement command for each axis of a machine to be controlled.

In addition, the command generation section 12B outputs, in addition to the movement command generated, even the type of the instruction (e.g., a fast-forwarding instruction, a straight line cutting movement instruction, a circular arc cutting movement instruction, a thread cutting instruction, a ta instruction, etc.) in the processing program in pairs, based on which the movement command is generated, to the command buffer section 13.

Here, the kind of the instruction is, for example, a positioning (fast-forwarding) instruction, a linear interpolation (cutting feed) instruction, a circular arc interpolation (cutting feed) instruction, a tapping instruction, a threading instruction, etc., and is hereinafter called an "instruction type".

Also, similar to the command generation section 12 according to the first embodiment, the command generation section 12B assigns the data output to the command buffer section 13 with a command number in the form of data for uniquely specifying an execution portion or place of the program in the unit of control, in addition to the movement command for each machine axis and the instruction type. Such a command number is similar to that in the first embodiment, and in the following explanation, description will be made with an assumption that a command number is a number that sequentially counts commands generated from the start of the program until now. The command output determination section 16B according to the second embodiment copies a command corresponding to a command number assigned to check result data from the command buffer section 13 together with the instruction type thereof.

In addition, the command output determination section 16B determines whether the instruction type thus copied is a command, such as a tapping command, a threading command shown in FIG. 11, or the like, which might cause serious damage to a part such as a workpiece (being processed), a tool, etc., if feeding of the tool would be stopped during execution of the instruction.

Such a determination as to whether it is an instruction that might cause serious damage for the workpiece, the tool, machine parts may be set beforehand, or may be able to be registered into a storage device in the numerical control system by operator's judgment. This does not influence the range of protection afforded by the appended claims of the present invention. Hereinafter, the instruction as determined in the above manner is referred to as an "attention instruction".

When the collision detection section 23 begins to check a command generated from the attention instruction, the command output determination section 16B does not output a command number to the machine drive section 17 so that the machine may not be stopped at a position thereof at which the execution of the last instruction before the attention instruction was terminated, as shown in FIG. 12A, but outputs a command number after the command generation section 12B has finished the generation of all the commands shown in FIG. 12B for one instruction.

As a result of this operation, the machine is put into a temporary sto state from the time the numerical control system has generated a series of commands related to the attention instruction until a check on the probability of collision of the commands is completed, and if no probability of collision has been detected in the commands for one attention instruction after the collision detection section 23 finished checking all the commands for the attention instruction, processing will be resumed from that instruction.

On the contrary, in case where a possible collision has been detected for even one of the commands related to the attention instruction, the command output determination section 16B does not output any of the commands related to the attention instruction, but notifies to the operator by means of a display section, for example, that a probability of collision has been detected.

In addition, it is desirable that when the command output determination section 16B searches, upon starting to check the commands generated from the attention instruction, the check result data buffer section 15 and detects a command generated from an instruction such as a fast-forwarding instruction, etc., other than a cutting instruction, the machine be temporarily stopped from the instant when all the commands generated from the instruction other than the cutting instruction have been output to the machine drive section 17 until the collision detection section 23 has checked all the commands generated from the attention instruction.

Moreover, in cases where the instruction type of the command is a fast-forwarding instruction, the command output determination section 16B performs a command output determination and outputs a command number to the machine drive section 17 when a difference obtained by subtracting the output command number from the checked command number is larger than or equal to a third threshold.

Here, note that unlike the second threshold which is preset as shown in the explanation of the operation of the command output determination section 16 in the first embodiment, the third threshold is able to be varied according to the instruction type whereby an appropriate number of check result data can be ensured in the check result data buffer 15.

Thus, in case of an instruction that might cause serious damage to parts such as a workpiece, a tool, etc., when feeding of the tool is stopped during the execution of the instruction, the machine is stopped temporarily until the check on the probability of collision of the series of commands related to the instruction is completed, so it is possible to avoid the deceleration or stoppage of the machine in the course of its movement during the time when such an attention instruction is being executed.

Further, in case of an instruction such as a fast-forwarding instruction in which the moving speed of the tool is fast, the number of commands for which the check on the probability of collision has been completed is more than those in case of a general instruction in which the moving speed of the tool is not so fast, as a result of which it is also possible to avoid the deceleration or stoppage of the machine in the course of execution of the instruction.

Embodiment 3

A numerical control system according to a third embodiment of the present invention is different from the numerical control system according to the first embodiment in a collision detection system, but is the same in other respects as that of the first embodiment with the like parts or elements being identified by the same reference numerals and characters while omitting an explanation thereof. The collision detection system according to the third embodiment is different from the collision detection system 2 according to the first embodiment in one aspect of operation after the detection of a collision, but is the same in other aspects of operation as that of the first embodiment.

Now, the collision detection section 23 is in a state in which by checking a check request command received from the linkage data sending and receiving section 14, it has determined that there is a probability of collision, and has returned check result data thereof to the linkage data sending and receiving section 14. In case where it is determined that there is a probability of collision in the checked command, the collision detection section 23 turns on a collision detection flag that is provided in the collision detection system. When the collision detecting flag is turned on upon reception of the following check request command from the linkage data sending and receiving section 14, the collision detection section 23 does not determine the probability of collision for the received command, or does not return check result data even if the probability of collision for the command is determined.

Under the circumstances, the checked command number, which is referred to by the command output determination section 16, does not progress, and the difference of the output command number to the machine drive section 17 from the checked command number does not become more than or equal to the second threshold, so no output is made to the machine drive section 17.

As a result, the machine drive section 17 drives the machine back by an amount corresponding to the second threshold from the command number at which the probability of collision is detected, after which it stops driving the machine. The numerical control system according to the third embodiment does not check and reply to commands after a command for which the collision detection section 23 determines that there is a probability of collision, so it becomes possible to stop the machine at a location away, by the second threshold, from the command for which it is determined that there is a probability of collision, and hence the numerical control system can be made to provide with a safer collision detecting function.

While the invention has been described in terms of preferred embodiments, those skilled in the art will recognize that the invention can be practiced with modifications within the spirit and scope of the appended claims.

What is claimed is:

1. A numerical control system in which a machine control system for controlling a machine at a prescribed period and a collision detection system, which operates in a period different from that of said machine control system or in a constantly changing period to check a probability of collision for a command that operates said machine, are operated in association with each other, said machine control system includes:
a command generation section that interprets a program for operating said machine, generates a command to said machine in the unit of control, and outputs said command by assigning to said command a command number for uniquely specifying an execution place of said program in the unit of control;
a command buffer section that stores a predetermined number of commands output from said command generation section;
a linkage data sending and receiving section that copies one of said commands stored in said command buffer section, sends it to said collision detection system, and transfers check result data when said check result data related to the probability of collision for said command is returned from said collision detection system;
a check result data buffer section that stores said check result data transferred from said linkage data sending and receiving section;
a command output determination section that analyzes the earliest stored one of said check result data stored in said check result data buffer section when the number of commands for which check result data are obtained among said commands stored in said command buffer section is more than or equal to a preset second threshold, and outputs a command number assigned to said earliest stored check result data when it is determined from the analysis of said earliest stored check result data that there is no probability of collision; and
a machine drive section that takes out, when a command number is output from said command output determination section, a command of said command number from said command buffer section, and applies said command thus taken out to said machine, said machine drive section being operable to temporarily stop said machine thereby to decelerate or stop it when there is no command number output from said command output determination section;
wherein when the probability of collision for a command received from said linkage data sending and receiving section is checked, said collision detection system returns check result data to said linkage data sending and receiving section by assigning a command number given to said checked command to said check result data.

2. The numerical control system as set forth in claim 1, wherein said command numbers are sequential numbers that are sequentially generated in the order of interpretations of instructions of said program during the execution of said one program.

3. The numerical control system as set forth in claim 1, wherein said command number is data comprising, in combination, a number that represents the order of an instruction of said program, and a number that represents the order of interpretation of said instruction of said program during the execution of said one program.

4. The numerical control system as set forth in claim 1, wherein said linkage data sending and receiving section sends the latest command last stored in said command buffer section to said collision detection system when the number of unchecked ones among those commands which are stored in said command buffer section becomes equal to or more than a preset first threshold.

5. The numerical control system as set forth in claim 1, wherein said linkage data sending and receiving section sends the latest command last stored in said command buffer section to said collision detection system when a distance between the command last sent to said collision detection system and the latest command last stored in said command buffer section becomes equal to or larger than a preset first threshold.

6. The numerical control system as set forth in claim 1, wherein
when generating a command to said machine, said command generation section outputs to said machine said command with its command type in the unit of said program based on which said command is generated; and
said command output determination section compares the command number assigned to the latest check result data returned from said collision detection system and the command number assigned to the command output from said machine drive section, stops outputting commands in said instruction other than a cutting feed instruction for a predetermined time when it is determined that there is a possibility that a processing delay occurs in said collision detection system and when there is an instruction other than said cutting feed instruction in said command buffer section, and also stops executing an attention instruction until the check is terminated when it is determined that there is a possibility that a processing delay occurs in said collision detection system.

7. The numerical control system as set forth in claim 1, wherein said collision detection system does not detect the probability of collision, or does not return check result data, for a command sent from said linkage data sending and receiving section after sending check result data for a command for which it is detected that there is a probability of collision.

* * * * *